United States Patent [19]

Rogers

[11] 4,299,147
[45] Nov. 10, 1981

[54] METHOD AND APPARATUS FOR CUTTING CAN BODIES

[75] Inventor: Roy E. Rogers, Louisville, Ky.

[73] Assignee: Donald V. Hanlon, Glendale Heights, Ill. ; a part interest

[21] Appl. No.: 72,993

[22] Filed: Sep. 6, 1979

[51] Int. Cl.³ .................. B23B 1/00; B23B 37/00; B31C 1/00
[52] U.S. Cl. ............................ 82/47; 82/53.1; 493/299
[58] Field of Search .................. 82/53.1, 47; 93/80

[56] References Cited

U.S. PATENT DOCUMENTS

| | | | |
|---|---|---|---|
| 549,707 | 11/1895 | Denney | 82/53.1 |
| 684,539 | 10/1901 | Cartwright | 82/53.1 |
| 1,698,250 | 1/1929 | Adams | 82/53.1 |
| 2,186,061 | 1/1940 | Berg et al. | 82/53.1 |
| 3,158,074 | 11/1964 | Brigham | 82/53.1 |
| 3,332,675 | 7/1967 | Bandura et al. | 82/53.1 |
| 3,756,128 | 9/1973 | Armstrong | 93/80 |
| 3,942,418 | 3/1976 | Smith | 93/80 |

*Primary Examiner*—Harrison L. Hinson
*Attorney, Agent, or Firm*—Maurice L. Miller, Jr.

[57] ABSTRACT

An elongated can body blank moves axially and is supported in part on a traveling interior mandrel. Traveling with the mandrel and elongated blank is a typical knife carriage having a plurality of knives mounted thereon for cutting the body blank into a plurality of individual can bodies. The improvement is a pivoting retainer member mounted on the knife carriage that functions to engage the open end of the axially moving can body blank rotating therewith and functions to precisely position the entire length of the blank with respect to the cutoff knives.

9 Claims, 5 Drawing Figures

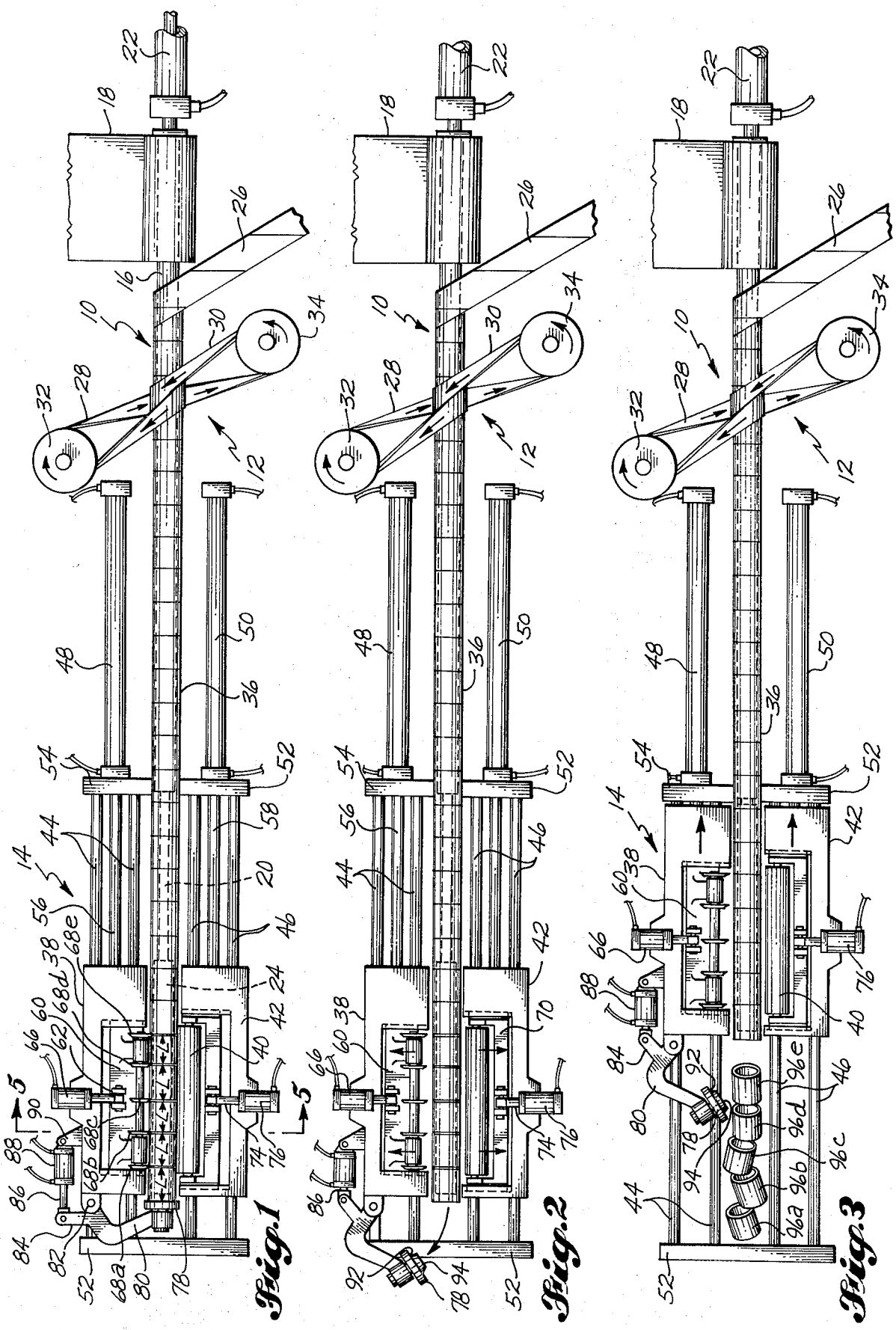

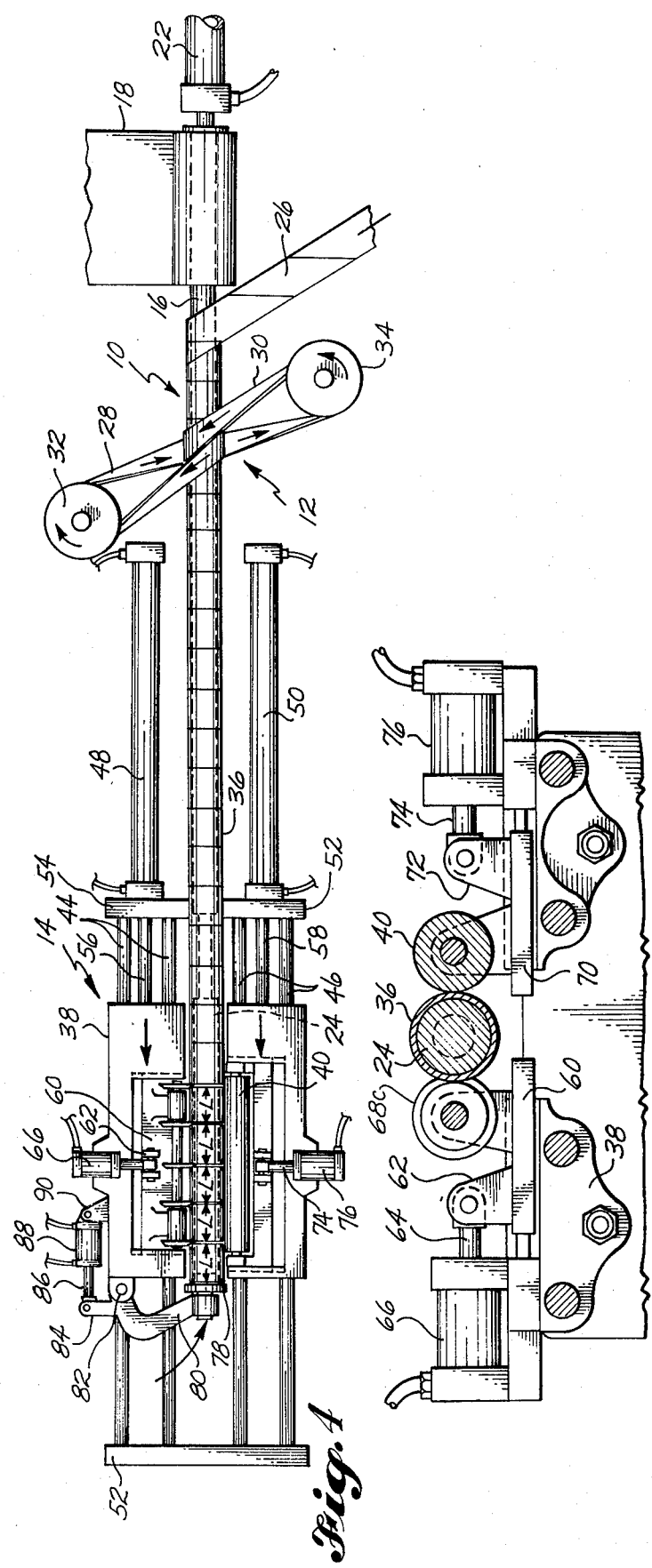

METHOD AND APPARATUS FOR CUTTING CAN BODIES

BACKGROUND OF THE INVENTION

This invention relates generally to can body manufacture and more particularly to an improved apparatus for providing precise cutoff control when cutting individual cans from an elongated body blank.

In the manufacture of spirally wound cans, roll stock of suitable body material is helically wound and bonded on a mandrel. This process is primarily utilized with composite body material and, after the continuous helical tube is formed, it is then cut into individual can bodies of appropriate length. The roll stock material is usually printed with the appropriate product labels prior to being helically wound and, of course, there is a repetitive printed copy. The can bodies, after they are cut from the elongated tube, then undergo further processing; for example, adding an end closure, filling, and adding the other end closure.

At least two methods are used for cutting the elongated tube into individual can bodies. One method is to first cut a long section of the continuously wound helical tube, referred to as a "stick," and then to cut the stick into shorter lengths. The other principal method is to substantially continuously cut individual can body lengths from the continuously wound tube. Of course, in either method the cutting must be in registry with the repetitive printed copy on the elongated tube.

An example of a typical can cutting system is disclosed in U.S. Pat. No. 3,942,418 issued to C. J. Smith and assigned to Container Corporation of America. Disclosed in the Smith patent is a winding mandrel on which the helically wound tube is formed together with a drive means for continuously moving the so-formed tube axially to the cutting station. At the cutting station, a knife carriage is operable which also travels axially with the tube. The knife carriage and traveling tube are synchronized so that cutting of the individual can bodies is effected.

A problem when cutting individual can bodies from elongated printed tubes using prior art methods is that the knives are not always precisely positioned so as to be in registry with the printing. In the past, one way to accommodate the problem has been the provision of planned waste referred to as a "scrap ring." It is usually necessary to cut a scrap ring each time the knives on the cutoff carriage are brought into the cutting position. Of course, it is recognized in the art that the necessity of providing a scrap ring increases the overall manufacturing cost. In addition, can bodies that are produced with the provision of a scrap ring typically have the printing (the resulting label) on each can off-centered (referred to as "floating copy") which leads to an aesthically unpleasing appearance when the can product is on the shelf of the retailer. This results when a knife carriage has a plurality of knives such as six whereby six can bodies are generated at once and the floating copy will be a part of each body when the knives are not precisely positioned. Oftentimes, if the rotary knives are not repositioned in a controlled manner for each succeeding cutting cycle, the floating copy will tend to be cumulative with cans being unacceptable since the printed copy will be completely off-center.

There are control systems in the prior art for spiral winding machines that are designed to cut individual can bodies from the elongated tube sections in good registration with the label copy. However, it has been found that these control systems require frequent adjustments so as to be synchronized with the label copy, requiring constant attention by an operator. This, of course, adds to the overall cost of the can manufacturing process.

Of course, it will be recognized by those skilled in the art that not only must the label copy be considered when cutting individual can bodies, but the knives on a moving carriage have the capability of cutting long or short can bodies, and this problem must also be considered. Long can bodies can be trimmed to size but a short can body is unacceptable.

Thus the primary purpose of the present invention is to precisely control the position of the elongated tube with its printed copy in relation to the cycling cutoff knives. If the desired relationship can consistently be maintained during operation, the provision of a scrap ring can be eliminated, thereby increasing utilization of the can body material while generating individual can bodies with well-centered labels. In addition, the precise control length, standards are consistently maintained. These and other objects of the present invention will be more fully understood and appreciated upon reading the specification to follow in conjunction with the attached drawings.

SUMMARY OF THE INVENTION

Briefly stated, the present invention is practiced in one form by incorporating into an axially moving cutoff knife carriage a pivotal retainer member. The pivotal retainer member is mounted on the downstream end of the carriage and is functional to pivot downwardly to a position where it will impact the end of an axially moving elongated body blank. The retainer element moves to a fixed position relative to a set of cutoff knives and establishes a fixed distance between the end of the can body blank and each of the knives within the set. Further, the retainer element serves to urge the can body blank in an axial direction against a driving bias provided by the drive means to the proper position relative to the cutoff knives. Once the retainer element has precisely positioned the elongated body blank, the knives will be actuated to cut a plurality of individual can body blanks. After the individual body blanks are cut, the retainer element will pivot upwardly out of the way so the individual blanks can be removed from the cutoff mandrel.

BRIEF DESCRIPTION OF THE DRAWINGS

FIG. 1 is a somewhat schematic plan view of a spiral winding machine depicting the retainer element in engagement with the elongated can body blank.

FIG. 2 is a view similar to FIG. 1 but shows the retainer element of the present invention being disengaged for release of the individual can bodies.

FIG. 3 is yet another view similar to FIG. 1 showing the individual can bodies being stripped from the cutoff mandrel.

FIG. 4 is also a view similar to FIG. 1 showing the retainer element of the present invention just engaging an elongated can body blank.

FIG. 5 is a cross-sectional view taken along line 5—5 of FIG. 1 and illustrates in greater detail the cutting station.

DETAILED AND ENABLING DESCRIPTION

Referring first to FIGS. 1 and 5, a general description will first be given of a typical spiral winding machine suitable for manufacturing helically wound elongated can body blanks from flexible stock. The spiral winding machine will not be described in great detail since, as previously pointed out, they are commercially available from many sources and an example of one such machine is disclosed in U.S. Pat. No. 3,942,418 assigned to Container Corporation of America. The spiral winding machines are typical in that there is a winding station generally indicated at 10, drive means generally indicated at 12 for causing axial travel, and a cutoff station generally indicated at 14. At winding station 10 a substantially horizontal cantilevered winding mandrel 16 extends outwardly from a mounting means 18. Winding mandrel 16 is rigidly mounted on its mounting 18 but is hollow in order to allow for the free travel therethrough of drive rod 20. Drive rod 20 is operated by an actuating cylinder 22 positioned opposite winding mandrel 16 on mounting means 18. Actuating cylinder 22 is connected to a source of fluid power (not shown). Drive rod 20 is mounted so as to reciprocate axially back and forth within winding mandrel 16 while being rotatable therein. Attached to the end of drive rod 20 is the generally axially extending reciprocable cutoff mandrel 24. Cutoff mandrel 24 reciprocates between a position substantially adjacent one end of winding mandrel 16 to an extended position coinciding with the downstream end of cutoff station 14.

Towards the upstream end of winding mandrel 16, the incoming can body stock 26 is fed onto mandrel 16. Can body stock 26 enters at an inclined angle from the axial direction and is caused to be helically wound about mandrel 16 by way of the drive means 12. Drive means 12 in the embodiment depicted is comprised of a pair of oppositely spaced belts 28, 30 on sheaves 32, 34 both trained about the body stock on mandrel 16 causing it to advance in the axial direction in the downstream direction. Each flexible winding belt 28, 30 is driven in the appropriate direction as will be well understood by those skilled in the art. The winding belts serve to helically wind the incoming stock 26. As the body stock 26 enters the winding station 10, suitable adhesive will be applied to an edge and, as it is helically wound, an overlap relationship will be generated so as to continuously bond the helically wound stock. The resulting elongated can body blank is indicated at 36 and will be continuously formed and caused to travel axially in the downstream direction over winding mandrel 16. As previously mentioned, the flexible winding belts 28, 30 continuously advance the elongated body blank 36 as it continuously revolves about both winding mandrel 16 and cutoff mandrel 24.

At cutoff station 14 at least one individual can body blank will be cut from the continuously moving can body blank 36. The operating mechanism at cutoff station 14 includes an axially movable knife carriage 38 together with an axially movable backup roll 40 mounted in a yoke member 42. Both the knife carriage 38 and roller 40 are mounted so as to synchronously move in the axial direction. A plurality of axially extending spaced rods 44 serve to support the knife carriage 38 while a similar plurality of elongated rods 46 serve to support the yoke 42. Attached to the knife carriage 38 and yoke member 42 respectively are the actuating cylinders 48, 50. Rods 44 and 46 are fixed between a pair of axially spaced support walls 52, 54 essentially defining the axial dimension of the cutoff station 14. Extending axially in the upstream direction from the walls 52, 54 and substantially fixed thereto are the cylinders 48, 50. The drive rods 56, 58 of each cylinder extend through walls 52, 54 and are fixed to their respective knife carriage and yoke member.

Mounted on knife carriage 38 is a transversely slidable mounting means 60. Attached to mounting means 60 is an upstanding dog member 62 to which is connected a drive rod 64 which is part of the transversely extending actuating cylinder 66 mounted on carriage 38. The function of actuating cylinder 66 is to transversely reciprocate the plurality of rotary knives 68a–68e into a cutting relationship with the traveling can body blank 36.

The roller 40 is also transversely movable with respect to the axial center line of traveling can body blank 36 and is similarly mounted on a transversely slidable mounting means 70. An upstanding dog element 72 on mounting means 70 has connected to it a roller drive rod 74 which is in turn controlled through actuating cylinder 76. All of these mechanisms are generally known and are within the prior art. The function of roller 40 is to provide a backing force to the plurality of rotary knives 68a–68e since the cutoff mandrel 24 is cantilevered. The cutoff mandrel 24 is adapted to revolve about an axial center line and therefore is mounted on bearings (not shown) within winding mandrel 16.

The improvement comprising the present invention includes in part a pivotally mounted rotatable retainer element 78. The retainer element 78 is mounted on the knife carriage 38 through a linkage mechanism consisting of an arm 80 having a crook in it. At pivot point 82 the arm 80 and retainer element 78 are caused to pivot in both an axial and a transverse motion. A lever arm 84 has attached to it a drive rod 86 of an actuating cylinder 88. Actuating cylinder 88 is attached at its opposite end to an upstanding dog element 90 mounted on the edge of knife carriage 38.

As will be appreciated when referring to the drawings, the arm 80 extends inwardly to a position which is substantially in line with the axial center line of cutoff mandrel 24. The retainer element 78 has a substantially circular flange 92 which is slightly larger in diameter than the diameter of the elongated body blank 36 together with a forwardly extending protrusion 94 which is approximately the same diameter as the inside diameter of body blank 36. As previously pointed out, the flange and protruding portion are mounted so as to be rotatable. The retainer element 78 is pivotal between an extended position where it is substantially in line with the axial center line of a can body blank 36 to a position where it is above the center line out of the way of both the body blank and knife carriage. When retainer element 78 is in its extended position, the distance indicated as "L" between the upstream circular face of flange 92 and the first knife 68a is a predetermined fixed distance. It is the distance corresponding to the desired length of at least the first individual can body to be cut from the can body blank 36. The individual can bodies generated by the cutting process are indicated as 96a–96e. In the embodiment depicted, the present invention eliminates the necessity for a scrap ring and only requires the use of five rotary knives 68a–68e to generate five individual can bodies 96a–96e during one cutting cycle. Of course, it will be recognized that a lesser number of knives could be utilized with the present invention.

Turning now to a description of the operation of the invention, reference will be made to the sequence of operation depicted in FIGS. 1-4 wherein a cutoff cycle is shown. Reference will first be made to FIG. 4. Here knife carriage 38 has just returned from a previous cutoff cycle and is beginning its axially downstream movement. Synchronously with the knife carriage, cutoff mandrel 24 has returned and will begin to travel axially downstream with the knife carriage, rotating as its moves. A section of spirally wound can body blank 36 will be axially moving with cutoff mandrel 24. At this point the plurality of rotary knives 68a-68e are in their retracted positions as is the retainer element 78 and roller 40. Of course, yoke member 42 is also traveling axially substantially simultaneously with and adjacent knife carriage 38. When an adequate length of can body blank is over axially moving cutoff mandrel 24, a suitable control system (not shown) will be operable to actuate cylinder 88 thereby moving the retainer element 78 to its extended position axially in line with cutoff mandrel 24. When rod 86 is fully extended, the upstream circular face of flange 92 will abut the downstream edge of can body blank 36. The force exerted by retainer element 78 on can body blank 36 is sufficiently strong to urge the entire helically wound body blank axially upstream if it has slightly extended past the nominal length of the first individual can body. Since drive means 12 consists in part of the flexible winding belts 28, 30, they are resilient enough to accept the upstream movement of the entire body blank. Once retainer element 78 is in place and abutting the downstream edge of body blank 36, roller 40 will be actuated to move transversely inwardly as will the knives 68a-68e. The control system will, of course, actuate cylinder 76 and cylinder 66 to cause the transverse movement. While the knife carriage 38 and the yoke 32 continue their axially downstream movement, rotary knives 68a-68e will cut the five individual can bodies 96a-96e from blank 36.

The overall control system also serves to control the actuating cylinders 48, 50 and therefore the axial movement of knife carriage 38 and yoke member 42.

In FIG. 1 the knife carriage and yoke are in their downstream positions with the rotary knives having generated the individual can bodies 96a-96e. At this point the control system actuates cylinder 88 to retract retainer element 78, pivoting it to its retracted position. Substantially simultaneously therewith the respective cylinders 66, 76 are actuated to retract the rotary knives 68a-68e and roller 40. At this point the rotating cutoff mandrel 24 is then cycled to begin its upstream movement and it will thereby, since the overall can body blank 36 will continue to be formed, "strip off" the can bodies 96a-96e. This portion of the cycle is depicted in FIG. 3 showing the individual can bodies being stripped off while the knife carriage 38 and yoke member 42 are retracted to begin the cycle again.

Thus it should be appreciated that during the operation of the present invention the retainer element 78 will control the precise position of the elongated can body blank 36 with respect to the rotary cutoff knives 68a-68e. The method does not require the use of the typical "scrap ring," thereby saving valuable material. Also, since the can body blank is precisely positioned for each cutoff cycle, the label copy will be in precise alignment for each individually generated can body, thereby producing on a consistent basis cans having high quality printing. Such cans are readily acceptable by commercial retailers since they have an aesthetically pleasing appearance when placed on the retailer's shelves.

While a detailed description of the present invention has been given as has its operation, many modifications may occur to those skilled in the art. All such modifications are intended to be included within the scope of the appended claims.

What is claimed is:

1. A method for cutting individual can body blanks from an elongated blank of the type having an axially movable knife carriage where the elongated blank travels axially by flexible drive means substantially together with the knife carriage, the steps of which comprise
    engaging a retainer element pivotally mounted on said knife carriage against an end of said elongated blank,
    urging said blank upstream with said retainer element against the driving bias of said flexible drive means into a fixed position relative to said knife carriage, and
    cutting at least a portion of said blank to form at least one individual can body blank while said blank is held in said fixed position.

2. A method for cutting individual can body blanks from an elongated blank comprising
    helically winding an elongated can blank around and along a winding and cutoff mandrel using flexible drive means,
    engaging a retainer element pivotally mounted on a knife carriage against a downstream end of said elongated blank,
    urging said elongated blank in an upstream direction against the driving bias of said flexible drive means to place said elongated blank in a fixed position relative to said knife carriage, and
    cutting said blank to form individual can body blanks along a downstream end portion of said elongated blank while said elongated blank is held in said fixed position.

3. A machine for cutting individual can body blanks from an elongated blank comprising
    a mandrel,
    flexible drive means associated with said mandrel for helically winding an elongated can blank around and along the latter,
    a knife carriage disposed adjacent said mandrel and adapted for cutting a portion of said elongated blank into individual can body blanks, and
    a retainer element pivotally connected to said knife carriage and adapted for engaging a downstream end of said elongated blank and for urging said elongated blank upstream against the driving bias of said flexible drive means to place said elongated blank in a fixed position relative to said knife carriage for uniform cutting of said individual can body blanks.

4. The machine of claim 3 wherein said retainer element is mounted so as to be rotatable as said elongated blank rotates.

5. The machine of claim 3 wherein said retainer element is pivotal between an extended position in line with the longitudinal axis of said elongated blank and a retracted position out of alignment with the advancing downstream end of said elongated blank.

6. The machine of claim 3 wherein said retainer element comprises a substantially circular flange adapted for engagement with the downstream end of said elongated blank.

7. The machine of claim 6 wherein said retainer element further comprises a protrusion extending forwardly of said flange, whereby said protrusion extends into the downstream end of said elongated blank when engaged.

8. The machine of claim 3 wherein said elongated blank is supported in part by an axially movable cutoff mandrel.

9. The machine of claim 3 wherein the downstream end of said elongated blank is positioned by said retainer element a distance from a first knife on said knife carriage corresponding to a predetermined length dimension of an individual can body.

* * * * *